Figure 1:
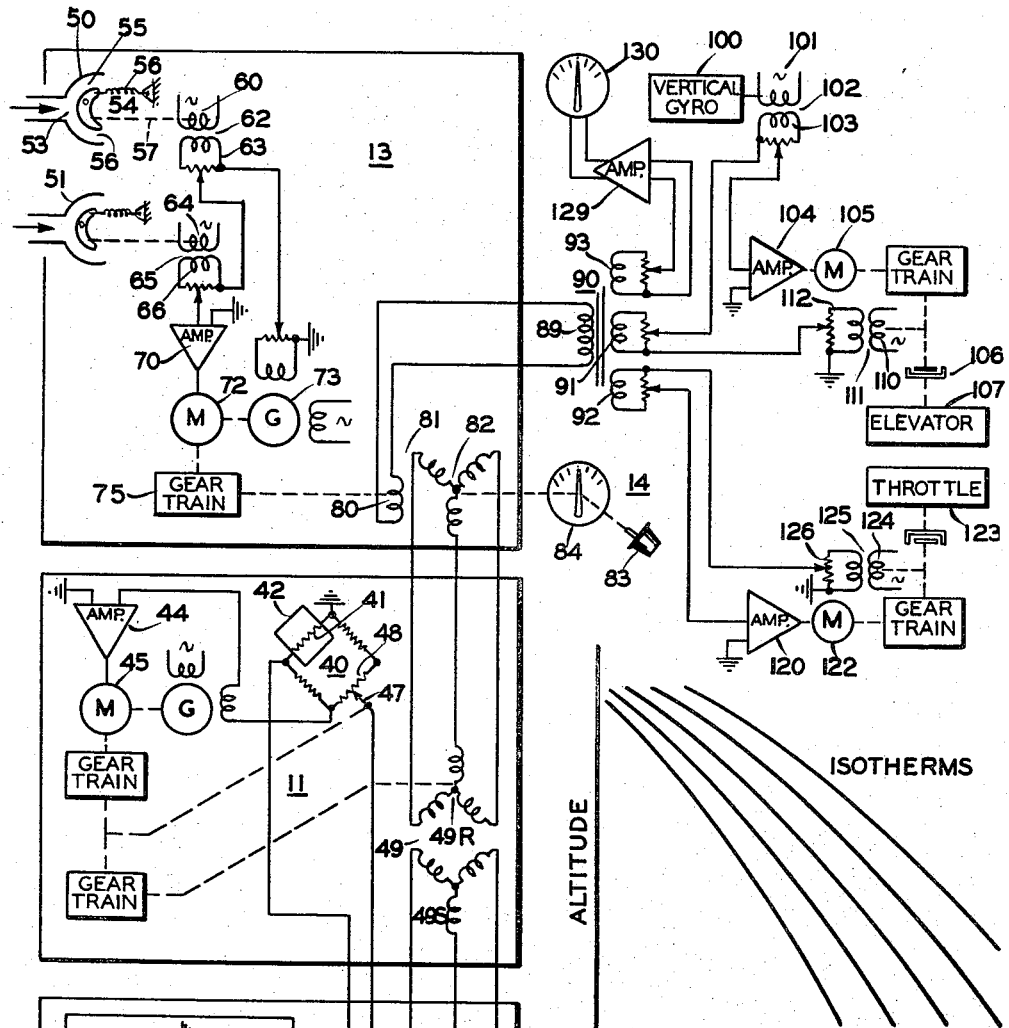

Aug. 23, 1960

J. M. SHIREY ET AL 2,950,076

CRUISE CONTROL

Filed Jan. 23, 1956

INVENTORS
SEYMOUR I. FINKEL
JOHN M. SHIREY

ATTORNEY

United States Patent Office 2,950,076
Patented Aug. 23, 1960

2,950,076

CRUISE CONTROL

John M. Shirey, Waldwick, and Seymour I. Finkel, North Arlington, N.J., assignors to The Bendix Corporation, a corporation of Delaware Filed Jan. 23, 1956, Ser. No. 560,713

13 Claims. (Cl. 244—77)

This invention relates generally to control systems and more particularly to a system by which an aircraft may be maintained at a flying level for maximum cruising performance.

As the gross weight of an aircraft changes in flight due to the consumption of fuel, the altitude level at which craft of certain types is flying also must be changed for maximum efficiency in the operation of the craft. The vertical flight path or profile also shifts with temperature changes. Due to a one degree Fahrenheit change in temperature, for example, the profile deviations can be varied approximately 100 feet in known types of transport aircraft. The profiles, moreover, are non linear functions of temperature, gross weight and altitude. With a fixed temperature isotherm, for example, a given change in gross weight requires an altitude change which varies according to the instantaneous altitude of the craft; and with a fixed gross weight of the craft, a given change in temperature requires an altitude change which varies with the instantaneous altitude of the craft.

An object of the present invention, therefore, is to provide a novel system for indicating the altitude level at which a craft should be flying for optimum performance.

Another object is to provide a novel means for controlling flight path of aircraft as a function of ambient temperature.

The present invention contemplates a novel computer for developing an output corresponding to the direction and extent of deviation of an aircraft from an elevation which gives optimum cruise performance; the computer taking into account the altitude and gross weight of the craft, and ambient air temperature. Since the initial gross weight can vary over a wide range, provision is contemplated for presetting the correct initial gross weight and for changing the gross weight as fuel is consumed.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description, and is not to be construed as defining the limits of the invention.

Figure 2:
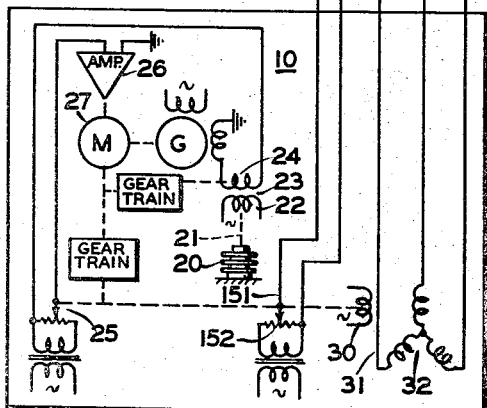

In the single sheet of drawing:

Figure 1 illustrates schematically the novel cruise computer of the present invention incorporated in the pitch and thrust control channels of an automatic pilot system; and Figure 2 shows a plot of typical flight profiles for an aircraft, such profiles defining the optimum flight altitudes for varying gross weights of the aircraft at fixed ambient temperatures.

Turning now to Figure 1, the information necessary for determining the optimum flight level for the aircraft is obtained from an altitude sensor 10, a temperature sensor 11, a fuel measuring device 13, and a weight setter or totalizer 14.

Altitude sensor 10 may be comprised of a conventional aneroid bellows 20 which by way of a suitable mechanical linkage 21 displaces rotor 22 of inductive device 23 relative to stator 24. As long as rotor 22 and stator 24 are in a null position, no signal is developed at stator 24; but a displacement of rotor 22 from this null position develops at stator 24 a signal corresponding in phase and amplitude to the direction and extent of the displacement. This signal is applied through a potentiometer 25 to a conventional amplifier 26 to operate a conventional induction motor 27, which drives stator 24 to a new null position and, at the same time, displaces the rotor 30 of a transmitter inductive device 31 relative to stator 32.

Temperature sensor 11 may be a normally balanced Wheatstone bridge 40 which has a temperature sensitive element 41 placed in a vortex creating assembly 42 that is mounted in a static pressure area externally of the craft. When the craft is in flight, a fixed spinner vane (not shown) directs the air passing through the assembly so as to create a vortex around the sensitive element. The cooling effect at the center of this vortex compensates for the dynamic heating so that the temperature measured is equal to that of the ambient free air. The unbalanced output of the bridge is fed through a conventional amplifier 44 to operate a servomotor 45 to drive the wiper 47 on potentiometer 48 to rebalance the bridge. The output or relative rotation of the shaft displaces the rotor winding 49R of a differential inductive device 49 whose stator 49S is connected to the stator winding 32 of inductive device 31.

Fuel measuring device 13 may comprise a series of identical metering devices 50 and 51 wherein the fuel flowing to the aircraft motor enters the inlet port 53 and is directed against a pivoted vane 54 mounted within a specially contoured metering chamber 55. The impact of the fuel causes the vane to move against the restraining force of a calibrated spiral spring 56 connected to the vane shaft 57. When the force of the restraining spring balances the force on the vane due to the impact of the fuel and the pressure drop across the vane, the vane will have assumed a definite angular position. This position corresponds to a measure of the gravimetric rate at which the fuel is passing through the metering chamber; and, hence, to the rate of fuel consumption of the engine.

The rotor 60 of an inductive device 62 is connected to the vane shaft 57 so that the displacement of the rotor develops at stator 63 a signal corresponding to the rate of fuel consumption. The shaft of fuel measuring device 51 likewise displaces rotor 64 of inductive device 65 relative to stator 66 to develop a signal. These signals are summed and applied to an amplifier 70 whose output operates a motor 72. Motor 72 drives a conventional rate generator 73 which provides a degenerative input to amplifier 70 so that the rate of motor operation corresponds to the amplitude of the signal applied to amplifier 70. Thus, motor 72 provides a shaft output corresponding to the rate of fuel flow and the length of time of fuel flow or the total fuel consumed, i.e., to the weight of fuel consumed. Through a suitable gear train 75, motor 72 correspondingly displaces the rotor 80 of an inductive receiver device 81 whose stator 82 is connected to the rotor 49R of inductive device 49.

Since the gross weight of the craft can vary widely, a suitable manual control knob 83 is connected to displace stator 82 to a position as indicated by index and dial 84 to correspond to the initial gross weight of the craft.

Altitude sensor 10 positions the energized rotor 30 relative to stator 32 by an amount corresponding to the altitude of the craft. Depending upon the relative position of rotor 30 and stator 32, varying voltages are induced in each leg of the stator winding 32 and are reproduced in stator winding 49S of differential inductive device 49. Dependent upon the ambient temperature, rotor 49R is positioned by temperature sensor 11 to change the relationship of the various voltages induced in rotor winding 49R. These voltages in rotor winding 49R are reproduced in stator winding 82 of inductive receiver device 81. Knob 83 is turned initially to set the total gross weight of the craft, and establish the null position for rotor 80 and stator 82.

When the craft is on the correct altitude for the instantaneous condition of altitude, temperature and gross weight, no output is developed at rotor 80. Upon any deviation from this profile or altitude condition, the signal developed at rotor 80 corresponds in phase and amplitude to the direction and extent of the deviation.

As fuel is consumed in flight, rotor 80 of inductive device 81 is displaced relative to stator 82. If the aircraft changes altitude at the same time in accordance with the set flight profile, the position of rotor 31 relative to stator 32 will have been changed correspondingly so that no output develops at rotor 80. If a corresponding change has not taken place, the output from rotor 80 corresponds in phase and amplitude to the direction and extent of deviation of the craft from the desired flight level. The output from rotor 80 may be applied to the primary winding 89 of a coupling transformer 90 and coupled to secondary windings 91, 92 and 93.

Secondary windings 91 and 92 may be the signal inputs for a conventional automatic control system. For simplicity, the automatic control herein is illustrated as utilizing a vertical gyro 100 which, in a known manner, displaces rotor 101 of inductive device 102 relative to stator 103 upon a displacement about the pitch axis. In a known manner, the appearance of a signal at secondary winding 91 is applied to an amplifier 104 that operates a motor 105, which through a suitable clutch 106, displaces an elevator surface 107 to change the pitch attitude of the craft. Motor 105 operates until the displacement of rotor 110 of follow-up inductive device 111 develops at stator 112 a signal to equal and oppose the signal at secondary winding 91. At this time the net input to amplifier 104 is zero and the motor stops with the elevator surface displaced.

As the displaced elevator surface changes the pitch attitude, the resulting pitch attitude displacement develops at stator 103 of inductive device 102 a signal which corresponds to the pitch attitude and which builds up toward a balance with the signal at secondary winding 91. The follow-up device 111 then prevails to return the elevator surface toward its streamlined position. The follow-up and attitude signals instantaneously balance the signal at secondary winding at some position other than the streamlined position of the elevators.

The signal appearing at secondary winding 92 is applied to an amplifier 120 that operates motor 122 to displace throttle 123 to increase or decrease the throttle setting, depending upon whether the craft is above or below the desired profile. Motor 122 operates until the displacement of rotor 124 of inductive device 125 develops at stator 126 a signal to equal and oppose the signal at secondary winding 92.

To visually indicate the position of the craft with respect to the desired flight profile, the output of the novel cruise computer from secondary winding 93 may be applied through a discriminator type amplifier 129 to a conventional indicator 130. When the craft is on the desired profile, the output will be zero and the indicator will be at the zero position; and movement of the pointer from the zero position will indicate by its direction and extent the direction and amount of deviation of the craft from the desired profile. If the automatic pilot is not engaged to control the craft, the human pilot may operate the craft manually to maintain the indicator at zero and maintain the craft on the desired profile.

So that the profiles may be non linear functions of the measured variables, motor 27 displaces the wiper of potentiometer 25 which is energized by a suitable source of alternating current. This varies the actual shaft rotation of motor 27 for a given change in altitude as a function of altitude, whereby the output at rotor 80 for a given temperature and gross weight relationship is made a non linear function of altitude.

The wiper 151 of a potentiometer 152 which is energized from a suitable source of alternating current is also positioned by the output of motor 27; and since potentiometer 152 supplies energization to bridge 40, it serves to adjust the temperature and gross weight relation as a function of altitude.

The foregoing has described a novel cruise computer for maintaining a craft on a desired flight profile predetermined as a function of the gross weight of the craft and the ambient air temperature. The profile may also be varied as a non linear function of altitude and temperature.

Although but one embodiment of the invention has been illustrated and described, various changes can be made in the design and arrangement of the parts without departing from the spirit and scope of the invention as the same will now be understood by those skilled in the art.

We claim:

1. A device for computing the optimum flight profile for an aircraft, comprising means for developing a first signal corresponding to the gross weight of the craft, means for developing a second signal corresponding to the altitude of the craft, means for developing a third signal corresponding to the ambient air temperature, and means coordinating said signals for developing an output corresponding to the departure of the craft from an optimum flight profile defined by said gross weight and ambient temperature.

2. A device of the class described, comprising means providing a first control effect corresponding to the gross weight of the craft, means providing a second control effect corresponding to the altitude of the craft, means for modifying said second control effect in accordance with ambient temperature, and means for combining said first and modified second control effects to develop a resultant output corresponding in sense and magnitude to the direction and extent of deviation of the craft from an optimum course profile defined by said gross weight and ambient temperature.

3. A computer providing an output corresponding to the position of an aircraft with respect to an optimum cruise position defined in accordance with aircraft gross weight and ambient temperature, comprising means providing a first control effect corresponding to the gross weight of the craft, means providing a second control effect corresponding to the altitude of the craft, means providing a third control effect corresponding to the ambient temperature of the air, means for modifying said third control effect in accordance with the altitude of the craft, and means for developing an output corresponding to the difference in said first and second control effects and varied by said modified third control effect.

4. A computer for indicating the position of an aircraft with respect to an optimum cruise position, comprising means providing a first control effect corresponding to the gross weight of the craft, means providing a second control effect corresponding to the altitude of the craft, means for modifying said second control effect in accordance with ambient temperature, means for combining said first and modified second control effects develop a resultant output corresponding in sense and magnitude to the direction and extent of deviation of the craft from an optimum cruise profile defined by said gross weight and ambient temperature, and an indicator responsive to said resultant output for indicating the sense and magnitude of the output.

5. A computer for indicating the position of an aircraft with respect to an optimum cruise position, comprising means providing a first control effect corresponding to the gross weight of the craft, means providing a second control effect in accordance with the ambient temperature, means for combining said first and second control effects to develop a resultant output corresponding in sense and magnitude to the direction and extent of deviation of the craft from an optimum cruise profile defined by gross weight and ambient temperature, and an indicator responsive to said resultant output for indicating the sense and magnitude of the output.

6. A system for maintaining an aircraft on an optimum cruise profile, comprising means providing a first control effect corresponding to the gross weight of the craft, means providing a second control effect corresponding to the altitude of the craft, means for modifying said second control effect in accordance with ambient temperature, means for combining said first and modified second control effects to develop a resultant output corresponding to the deviation of the craft from an optimum cruise profile defined by said gross weight and ambient temperature, and means responsive to said output for changing the pitch altitude of the craft to return the craft to the optimum cruise profile and for changing the throttle setting to bring the craft to the optimum cruise profile.

7. An aircraft control system comprising means providing a first control effect corresponding to the gross weight of the craft, means providing a second control effect corresponding to the altitude of the craft, means for modifying said second control effect in accordance with ambient temperature, means for combining said first and modified second control effects to develop a resultant output corresponding in sense and magnitude to the direction and extent of deviation of the craft from an optimum cruise profile defined by said gross weight and ambient temperature, and means responsive to said resultant output for positioning the pitch control surfaces of the craft to return the craft to said profile.

8. An aircraft control system comprising means providing a first control effect corresponding to the gross weight of the craft, means providing a second control effect corresponding to the altitude of the craft, means for modifying said second control effect in accordance with ambient temperature, means for combining said first and modified second control effects to develop a resultant output corresponding in sense and magnitude to the direction and extent of deviation from an optimum cruise profile defined by said gross weight and ambient temperature, and means responsive to said resultant output for changing the throttle setting of the craft to bring the craft to said profile.

9. A computer for developing an output indicative of the altitude of an aircraft with respect to an optimum altitude for cruise performance, comprising means providing a first control effect corresponding to the initial gross weight of the craft, means for modifying said first control effect as a function of the fuel consumed by the craft, means providing a second control effect corresponding to the altitude of the craft, means for modifying said second control effect in accordance with ambient temperature, means for combining said modified first and modified second control effects to develop a resultant output corresponding in sense and magnitude to the direction and extent of deviation of the craft from the optimum altitude level defined in accordance with craft weight and ambient temperature.

10. A computer for developing an output indicative of the altitude of an aircraft with respect to an optimum altitude for cruise performance, comprising means providing a first control effect corresponding to the initial gross weight of the craft, means for modifying said first control effect as a function of the fuel consumed by the craft, means providing a second control effect as a non-linear function of the altitude of the craft, means for modifying said second control effect in accordance with ambient temperature, and means for combining said modified first and modified second control effects to develop a resultant output corresponding in sense and magnitude to the direction and extent of deviation of the craft from the optimum altitude level defined in accordance with craft weight and ambient temperature.

11. A computer for developing an output indicative of the altitude of an aircraft with respect to an optimum altitude for cruise performance comprising means providing a first control effect corresponding to the initial gross weight of the craft, means for modifying said first control effect as a function of the fuel consumed by the craft, means providing a second control effect as a non-linear function of the altitude of the craft, means for modifying said second control effect in accordance with a non-linear function of ambient temperature, and means for combining said modified first and modified second control effects to develop a resultant output corresponding in sense and magnitude to the direction and extent of deviation of the craft from the optimum altitude level defined in accordance with craft weight and ambient temperature.

12. A computer for developing an output indicative of the deviation of the craft from an optimum cruise profile, comprising a transmitter inductive device, a receiver inductive device, a differential inductive device connecting said transmitter and receiver, means for actuating one of said inductive devices as a function of the gross weight of the craft, means for actuating another of the said devices as a function of the altitude of the craft, and means for actuating the remaining one of said devices as a function of ambient temperature, whereby the output of said device corresponds to the deviation of the craft from an optimum cruise profile defined by said gross weight and ambient temperature.

13. A computer for developing an output indicative of the deviation of the craft from an optimum cruise profile, comprising a transmitter inductive device, a receiver inductive device, a differential inductive device connecting said transmitter and receiver, means for actuating one of said inductive devices as a function of the gross weight of the craft, means for actuating another of the said devices as a function of the altitude of the craft, and means for actuating the remaining one of said devices as a function of ambient temperature, whereby the output of said devices corresponds to the deviation of the craft from an optimum cruise profile defined by said gross weight and ambient temperature, and means under control of said output for controlling said craft in a direction to reduce said output to zero.

References Cited in the file of this patent

UNITED STATES PATENTS

| | | |
|---|---|---|
| 2,358,803 | Hanson et al. | Sept. 26, 1944 |
| 2,496,294 | Kellogg | Feb. 7, 1950 |
| 2,701,111 | Schuck | Feb. 1, 1955 |